Patented Apr. 24, 1945

2,374,428

UNITED STATES PATENT OFFICE 2,374,428

PROCESS FOR ACYLATING ESTERS OF HYDROXY CARBOXYLIC ACIDS

Charles H. Fisher, Abington, Pa., and Martin L. Fein, Riverside, N. J., assignors to Claude R. Wickard, as Secretary of Agriculture of the United States of America, and his successors in office No Drawing. Application April 5, 1943, Serial No. 481,873

3 Claims. (Cl. 260—484)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

Our invention relates to an improved process of acylating esters of hydroxy carboxylic acids, and, particularly to a process of acetylating alkyl lactates.

It is known that esters of hydroxy carboxylic acids can be prepared by treatment with acid anhydrides, acid chlorides and ketene. However, when accomplished by the procedures of previous investigators, the acylation of hydroxy carboxylic acids has been tedious, time-consuming, and not readily adaptable to continuous operation.

The methods used by previous investigators to acylate hydroxy esters usually comprise the following operations: (1) Using a catalyst, gradual addition of one reactant to the other with cooling and stirring, (2) standing at room or higher temperature for some time to allow reaction to go to completion, (3) neutralization of the catalyst, (4) filtration if neutralization product is insoluble, and (5) vacuum distillation. See: Smith, Fisher, Ratchford and Fein (Ind. Eng. Chem. 34, 473-9 (1942)); Burns, Jones and Ritchie (J. Chem. Soc. 1935, 403); Claborn and Smith (J. Am. Chem. Soc. 61, 2727 (1939)): Claborn, U. S. 2,222,363, Nov. 19, 1940. These methods, which are unnecessarily wasteful of time, materials and labor, are not readily operated continuously.

We have found that the procedures used in previous investigations can be simplified in such a manner that time, materials and labor are saved. Moreover, we have found that cooling is not necessary when the acylating agent is added to the alkyl ester of hydroxy acid, and that a catalyst is not necessary. When a catalyst is not used, neutralization and filtration are not required. We have also found that neutralization and filtration are not necessary when proper amounts of catalyst are used. Also, we have found that it is not necessary or advantageous to allow the reaction mixture to stand for some time prior to distillation. The finding that the acylation can be made to occur rapidly is of practical importance since, under these conditions, the acylation can be operated advantageously as a continuous process. Other advantages of our process over previous methods will become apparent from comparison of our process with directions given by previous investigators.

Our invention is illustrated by the following examples:

*Example I*

One drop of concentrated sulfuric acid was added to a mixture of 156 g. methyl lactate, 169 g. acetic anhydride (approximately 10 percent in excess of the theoretical amount), and 50 cc. of diphenyl ether. The temperature rose immediately to about 100° C. The mixture was allowed to stand for 45 minutes and was then distilled through a 12-inch Widmer column. The forerun consisted mainly of acetic acid. The desired product, methyl alpha-acetoxypropionate, distilled principally at 172° to 173° C. The fraction collected at 168° to 173° C. amounted to 211 g. (96 percent of the theoretical) and had a refractive index of 1.4091 at 20° C.

The diphenyl ether, which was used to drive over all the methyl alpha-acetoxypropionate, remained in the distilling flask. It was used in subsequent preparations of methyl alpha-acetoxypropionate.

*Example II*

Methyl lactate (156 g.), acetic anhydride (169 g.), and diphenyl ether (40 cc.) were mixed and distilled immediately through a 12-inch Widmer column. Acetic acid and 211 g. (96 percent of the theoretical yield) of methyl alpha-acetoxypropionate were obtained. Refractive index of the product at 20° C. was 1.4089.

*Example III*

A mixture of 169 g. acetic anhydride and one drop of concentrated sulfuric acid was added gradually from a separatory funnel to 156 g. of methyl lactate; during the addition the reaction temperature rose to 96° C. Diphenyl ether (50 cc.) was added and the mixture was distilled in vacuum. The yield of methyl alpha-acetoxypropionate boiling at 76° C. under 20 mm. of mercury pressure was 96.4 percent of the theoretical.

*Example IV*

When a mixture of 114 g. of ethyl lactate and 102 g. of acetic anhydride was distilled, acetic acid and 154.6 g. (96.6 percent of the theoretical yield) of ethyl alpha-acetoxypropionate was obtained. Most of the ethyl alpha-acetoxypropionate distilled at 182° C.; the specific gravity at 20° C. was 1.4083.

*Example V*

Methyl lactate (832 g. or 8 moles) was added from a separatory funnel to a mixture of 857 g. (8.4 moles) of acetic anhydride and 0.9 g. concentrated sulfuric acid contained in a flask provided with mechanical stirrer; the flask was immersed in a water bath. During the addition of methyl lactate the reaction temperature was kept at approximately 60° C. by addition of suitable amounts of ice to the water bath. Distillation of the reaction mixture yielded 1109.5 g. (94.9 percent of the theoretical) of methyl alpha-acetoxypropionate, most of which distilled at 63°–64° C. under 10 mm. of mercury pressure.

*Example VI*

One ml. of acetyl chloride was added to a mixture of one mole of methyl lactate (104 g.) and one mole of acetic anhydride (102. g.). The temperature rose from that of the room to 102° C. in 2.5 minutes. Diphenyl ether (50 ml.) was added and the mixture was distilled at atmospheric pressure. The yield of methyl alpha-acetoxypropionate was 94 percent of the theoretical.

*Example VII*

A mixture of 2 moles (208 g.) of methyl lactate and 2 moles (204 g.) of acetic anhydride was passed through a preheater at a controlled rate and into continuous distillation apparatus. The apparatus was arranged for accurate temperature control of the preheater, column sections and still pot (from which the product could be removed continuously). The material to be distilled, after being passed through the preheater, was allowed to enter at a point approximately two-fifths of the total length from the bottom of the column. The lower portion of the column and still pot were kept at temperature near the boiling point (172° C.) of methyl alpha-acetoxypropionate. The upper portion of the column and still-head were controlled in such a manner that acetic acid distilled over. The desired product, methyl alpha-acetoxypropionate, was removed from the still pot through a side arm and appropriate siphoning arrangement. Purity of the product was checked by index of refraction and distillation at fixed intervals. The overall height of the column used was approximately 6 feet, the preheater capacity was about 20 ml., the column diameter was approximately 22 mm., the upper column was packed with small Berl saddles, and the lower column had Vigreaux-type indentations. The still pot capacity was 100 ml.

Material of high purity was made continuously in high yield with the equipment described above, using the conditions given below:

| Feed rate | Preheater temperature | Contact time in preheater |
|---|---|---|
|  | °C. | Min. |
| 6 cc./min | 135 | 3.3 |
| 4 cc./min | 118 | 5.0 |
| 8 cc./min | 118 | 2.5 |

Material of high purity can be made in high yields at both faster and slower feed rates as well as at higher and lower preheater temperatures than those indicated above. Also, the preheater may be omitted entirely.

*Example VIII*

A mixture of 2 moles (236 g.) of ethyl lactate and 2 moles (204 g.) of acetic anhydride were reacted continuously in a manner similar to that described in Example VII. Slight changes in operating temperature of the distillation column were necessary because of the higher boiling point (177°–179° C.) of ethyl alpha-acetoxypropionate. Results similar to those described under Example VII were obtained with approximately the same operating conditions.

We are not limited to the particular materials or procedures used in the specific illustrations set forth in the examples above. The general applicability of our invention to the production of esters of hydroxy acids will readily be seen by those skilled in the art.

Also, it will be apparent to those skilled in the art that various modifications of procedure may be employed without departing from the scope of our invention. For example, the reactants may be passed directly into a continuous still without first being passed through a preheater. A liquid other than diphenyl ether, for instance, benzene or toluene, may be used with the reactants to facilitate distillation of the carboxylic acid. If a catalyst is used, sulfuric acid or acetyl chloride may be replaced by other acid catalysts, such as hydrogen chloride, zinc chloride, phosphoric acid, and toluene sulfonic acid, or by a base such as pyridine. Smaller or larger proportions of the acylating agent may be used. The time of preheating can be changed and the preheater temperature can be varied without adverse effects. Various types of packing can be used, or the packing can be eliminated, in the distillation column.

Having thus described our invention, we claim:

1. The process of acetylating alkyl lactates which comprises reacting an alkyl lactate and acetic anhydride by continuously introducing said lactate and acetic anhydride into a continuous still, continuously distilling the reactive mixture of said lactate and acetic anhydride, whereby acetic acid distills off and the alkyl alpha-acetoxypropionate corresponding to the lactate collects in the still, and continuously recovering said alkyl alpha-acetoxypropionate from the still.

2. The process defined in claim 1, in which the alkyl lactate is methyl lactate.

3. The process defined in claim 1, in which the alkyl lactate is ethyl lactate.

CHARLES H. FISHER.
MARTIN L. FEIN.